Jan. 25, 1938. S. G. ROSS 2,106,279
MANUFACTURE OF REINFORCED SHOE BOTTOM UNITS
Filed July 31, 1936 2 Sheets-Sheet 1
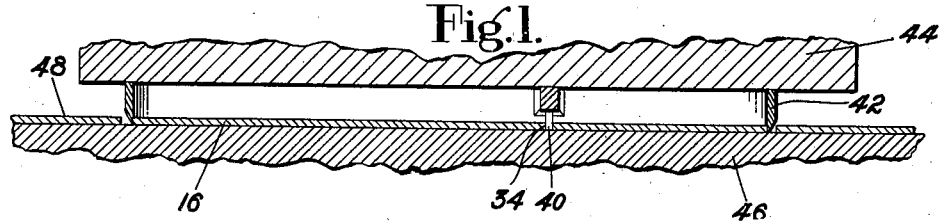
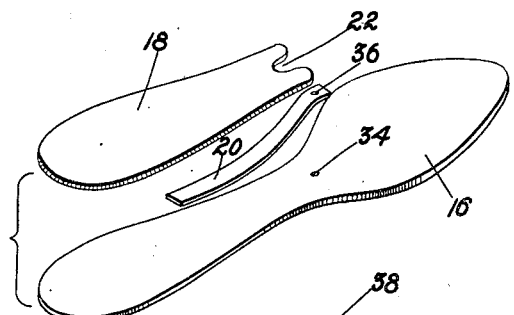
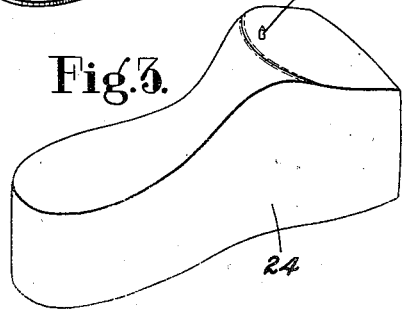
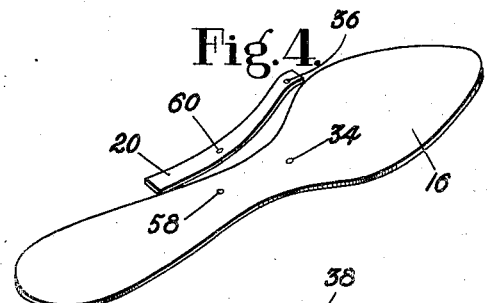
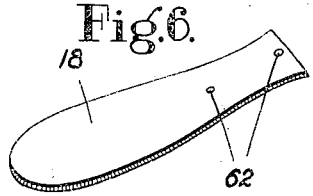
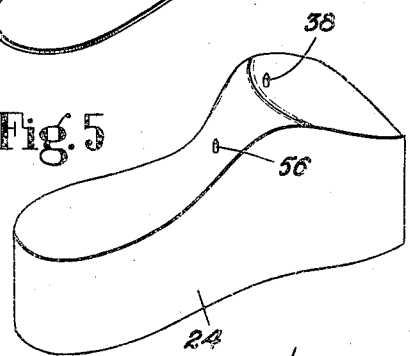

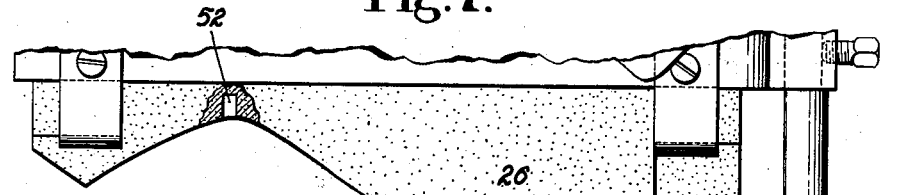
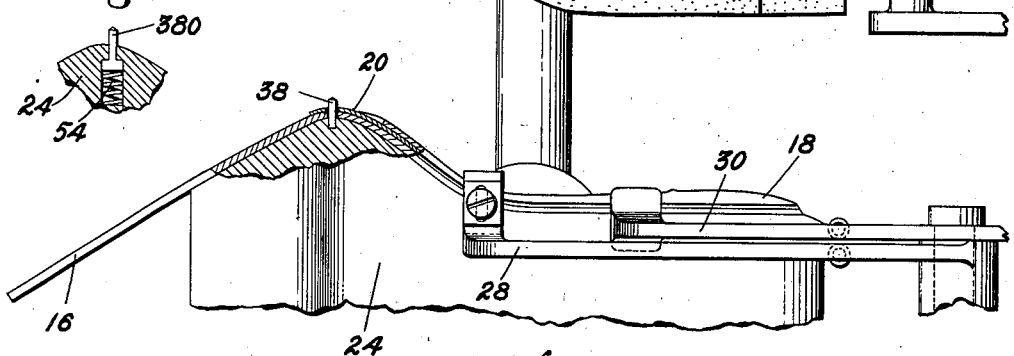
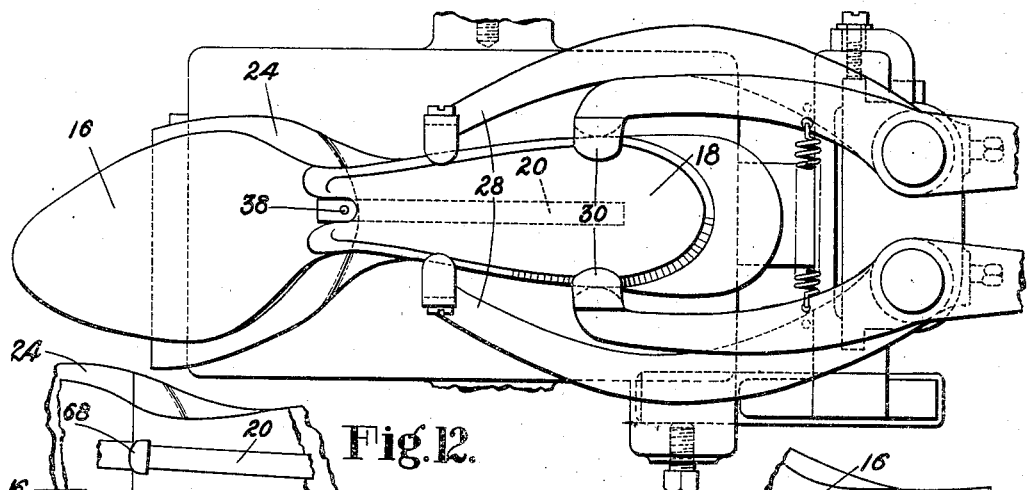
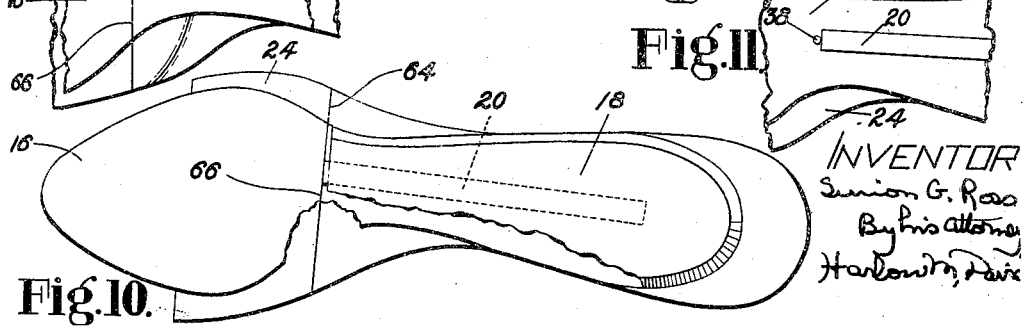

Patented Jan. 25, 1938

2,106,279

UNITED STATES PATENT OFFICE 2,106,279

MANUFACTURE OF REINFORCED SHOE BOTTOM UNITS

Simon G. Ross, Marblehead, Mass., assignor to United Shoe Machinery Corporation, Paterson, N. J., a corporation of New Jersey Application July 31, 1936, Serial No. 93,673

4 Claims. (Cl. 12—146)

This invention relates to improvements in the art of making reinforced shoe bottom units. Although not necessarily limited thereto the invention is herein illustrated with reference to the manufacture of molded insole units of the type comprising an insole, a heel and shank reinforcing piece secured by means of adhesive to the insole, and a shank stiffener which is interposed between the reinforcing piece and the insole.

One object of the invention is to provide an improved method of making reinforced shoe bottom units in the practice of which the component parts of a unit may be assembled and located in predetermined relation to each other directly upon a form which is to be used in the operations of molding the reinforcing piece and the insole and securing those parts and the shank stiffener together.

To the accomplishment of this object, the invention provides an improvement in methods of making reinforced shoe bottom units which consists in placing an insole provided with gaging means upon a form having gaging means associated therewith, and relatively locating the insole and the form by cooperatively relating the gaging means on the insole and the gaging means associated with the form, assembling a shank reinforcing piece with the insole, and thereafter molding the insole and the reinforcing piece to the contour of the form. As herein illustrated, a jig hole may be punched in the insole to constitute the gaging means on the insole and the form may be provided with a jig pin which is adapted to engage the jig hole in the insole. For the purpose of positively determining the longitudinal angular relation of the insole to the form two jig pins may be provided upon the form for cooperation with two jig holes in the insole. The pin or pins on the form may be made long enough to extend entirely through the insole and project above the insole for engagement with a shank stiffener to locate the shank stiffener relatively to the insole and the form. Moreover, if desired, the jig pin or pins may be made to project above the shank stiffener for engagement with a heel and shank reinforcing piece to locate the latter relatively to the other parts of the unit. For cooperation with the pin or pins one or more jig holes may be provided in the shank stiffener, or in both the shank stiffener and the reinforcing piece. Prior to the assembling of the parts of an insole unit upon the form suitable adhesive will be applied either to the insole, or to the reinforcing piece, or to both of said parts and, accordingly, after the parts have been assembled and relatively positioned by means of the gaging devices it will be necessary only to apply pressure to the assembled parts upon the form by means of a pad or other molding member in order to mold the insole and the reinforcing piece to the contour of the form and to cause those parts and the shank stiffener to be secured together by means of the adhesive and thus to provide an insole unit which will fit a last of a shape corresponding to that of the form.

The invention will now be explained with reference to the accompanying drawings, in which—

Fig. 1 is a vertical sectional view of a portion of a sole cutting press illustrating the operation of dieing out an insole and, at the same time, punching a jig hole therein;

Fig. 2 is a perspective view of the component parts of a reinforced insole unit illustrating the provision of a single jig hole in the insole and a single jig hole in the shank stiffener as the gaging means associated with those parts;

Fig. 3 is a perspective view of a molding form in which the gaging means consists of a single jig pin;

Fig. 4 is a perspective view of an insole and a shank stiffener in each of which parts two jig holes have been formed;

Fig. 5 is a perspective view of a form provided with two jig pins for use in relatively positioning an insole and a shank stiffener such as those shown in Fig. 4;

Fig. 6 is a perspective view of a heel and shank reinforcing piece having jig holes formed therein;

Fig. 7 is a view, partially in side elevation and partially in section, of a molding machine provided with a form adapted for use in relatively positioning and molding the parts of a reinforced insole unit, the parts of an insole unit being shown in position upon the form;

Fig. 8 is a detailed sectional view illustrating a modified construction of the gaging means associated with the form shown in Fig. 7;

Fig. 9 is a plan view of a portion of the molding machine shown in Fig. 7;

Fig. 10 is a plan view of a work supporting form similar to that shown in Figs. 7 and 9 but having modified gaging means thereon for cooperation with gaging means of modified formation upon an insole unit which is shown upon the form; and Figs. 11 and 12 are fragmentary plan views showing a form having an insole and a shank stiffener positioned relatively thereto and illustrating further modifications in methods of relatively locating those parts.

A reinforced insole of the type with which the present invention is concerned consists of three parts, viz., an insole, a heel and shank reinforcing piece of relatively stiff moldable material such as fiberboard, and a longitudinally curved metallic shank stiffener, the insole and the reinforcing piece being secured together by means of adhesive with the shank stiffener interposed between them and being molded both longitudinally and transversely to correspond to the longitudinal and transverse curvatures of the bottom of a last. In Fig. 2 there are shown an insole 16, a heel and shank reinforcing piece 18, and a molded, shank stiffener 20 as those parts appear before being assembled and secured together, the shank stiffener 20 being curved lengthwise to correspond to the longitudinal curvature of a high-arch last bottom but the insole 16 and the reinforcing piece 18 being flat. As shown, the reinforcing piece 18 has the same lateral edge contour as that of the heel and shank portion of the insole and its forward end portion is notched, as indicated at 22, to receive the forward portion of the shank stiffener. In the practice of the present invention these parts are adapted to be assembled in the desired locations relatively to one another and the insole and the reinforcing piece are adapted to be molded and secured together with the shank stiffener between them by means of molding forms of suitable construction. These forms may be made of metal and if desired they may be heated to facilitate the setting of the adhesive or the drying of the insole and the reinforcing piece in cases where it may be desired to have those parts in a tempered or moistened condition when introduced between the forms, but, as herein shown, the work supporting form 24 is made of wood and has a surface contour corresponding to that of the heel seat, shank and ball portions of a last having a high arch with which the insole unit is to be used, whereas the pad or presser member 26 (Fig. 7) is made of rubber or other yieldable material. Forms of the same types are used in a molding machine disclosed in United States Letters Patent No. 2,065,465 granted December 22, 1936, in the name of John M. Whelton, to which reference may be had for an understanding of the details of the construction and mode of operation of the machine.

To insure precision in locating and maintaining the component parts of the insole unit in the desired relative positions the insole 16 is provided with a jig hole 34, as shown in Fig. 2, the shank stiffener 20 is provided with a jig hole 36, and the form 24 is provided with a jig pin 38 for engaging the jig holes in the insole and the shank stiffener. The jig holes in the insole and in the shank stiffener may be punched therein by any suitable means. Advantageously, the jig hole in the insole may be formed therein at the same time the insole is died out as, for example, by means of a punch 40 carried by the die 42 which is employed in cutting out the insole (see Fig. 1 wherein the die is shown in the act of being forced by means of a presser member 44 against a cutting block 46 so as to cut an insole 16 from a sheet of stock 48 and at the same time to punch a jig hole 34 in the insole). In case it is desired to form the insole by a rounding operation a jig hole may be formed in the insole just prior to the performance of the rounding operation by means of a punch carried either by the clamp plate or by the pattern of a sole rounding machine. Advantageously the arrangement of the punch relative to the die (or to the clamp plate or pattern of the rounding machine) is such that the jig hole will be located adjacent to the break line and the jig pin is correspondingly located in the form 24, in order that it may locate the break line of the insole in true relation to that of the form. In making shank stiffeners it is a common practice to provide a tack hole 36 in the forward end portion of each shank stiffener and such tack hole, may, for the purposes of the present invention, be utilized not to receive the tack, but to receive the jig pin 38. The location of the jig pin with respect to the form and the location of the jig holes with respect to the insole and the shank stiffener are so coordinated that when an insole and a shank stiffener are assembled upon the form 24 with the jig pin engaging the jig holes, the insole will be located with its break line in register with that of the form and with its ball portion transversely centered relatively to the form while the shank stiffener will have its forward portion located widthwise with respect to the insole and will be so positioned lengthwise that its profile will register with that of the form. Since the insole is initially flat, while the shank-stiffener is initially molded, their profiles will not be alike until the insole has been molded to the contour of the form 24, and while the insole is in process of being molded relative creeping of the insole, and the shank-stiffener will be unavoidable. Nevertheless, the jig-pin 38 and the jig-holes 34 and 36 are arranged to maintain the insole and the shank-stiffener in true relation to the break line of the form 24, irrespective of creeping at the rear of the break line.

If the parts are styled for a low-arch last, the molding step may not produce any relative creeping of the insole and the shank-stiffener, or so little that the front end of the shank-stiffener need not be positively anchored on the jig-pin 38. In that event the shank stiffener may be made without any jig hole and the portion of the jig pin 38 which projects above the insole may be engaged by the front edge of the shank stiffener to locate the latter longitudinally with respect to the insole on the form, as illustrated in Fig. 11. As shown, the pad 26 has a cavity 52 formed therein to receive the upper end of the jig pin 38, as shown in Fig. 7, or alternatively, as shown in Fig. 8, the form may be provided with a depressible jig pin 380 which is backed up by a spring 54 and thereby adapted to yield when its upper end is engaged by the pad.

In assembling the component parts of an insole unit upon the form 24 the insole is first laid upon the form in such a position that the jig pin 38 will project through the jig hole 34. Thereafter the shank stiffener 20 is laid upon the insole with the jig pin either extending through the jig hole 36, if the shank stiffener has one, or engaging the front edge of the shank stiffener if the parts are styled for a low-arch last. Thereafter the heel and shank reinforcing piece 18 is laid upon the insole over the shank stiffener and may be located both lengthwise and widthwise relatively to the insole by manually registering its rear and longitudinal edges with the corresponding edges of the insole. The widthwise location of the reinforcing piece and of the heel end of the insole with respect to the form 24 may be established by gages 28 and 30 which may be constructed and arranged as fully described in the patent above referred to.

Prior to the assembling of the parts of a unit upon a form, the reinforcing piece or heel and shank portion of the insole, or both the reinforcing piece and said portion of the insole are coated with suitable adhesive such, for example, as rubber latex, and accordingly, when the pad 26 is depressed against the form 24 not only will the insole and the reinforcing piece be molded to the shape of the form but those members will also be securely attached together by means of the adhesive.

It will be appreciated that the use of the jig pin in locating the shank stiffener relatively to the insole renders unnecessary the provision of a separate shank stiffener positioning gage in the molding machine.

If it is desired to provide for alining the insole and the shank stiffener relatively to the form without the use of the gages 28 and 30, this result may be accomplished by providing an additional jig pin 56 upon the form 24, as shown in Fig. 5, and additional jig holes 58 and 60 in the insole and shank stiffener, respectively, for cooperating with the jig pin 56. Moreover, the reinforcing piece 18 may be provided with jig holes 62 (Fig. 6) arranged to be engaged by the jig pins 38 and 56 for the purpose of locating it in like manner. In case the form 24 is provided with only a single jig pin, as shown in Fig. 3, the location of the reinforcing piece may be determined by engagement of that pin with the foremost of the jig holes 62. The reinforcing piece may also be so designed that its location lengthwise relatively to the other parts of the unit may be determined by engagement of the jig pin 38 with the forward edge of the reinforcing piece whether that edge be notched, as shown in Fig. 2, or straight, as indicated in Fig. 10.

The desired locating of an insole and a shank stiffener relatively to the form may be accomplished without the provision of a jig pin upon the form or jig holes in either the insole or the shank stiffener by employing a form which is wider in its forepart than the widest insole, as shown in Fig. 10, and which is provided upon its upper surface with a gage in the form of a line or an indentation 64 which extends entirely across the form and is adapted to furnish a visual index for a similar line or indentation 66 correspondingly located upon the upper surface of the insole. After an insole having a line 66 thereon has been placed upon a form in register with the mark 64 a shank stiffener of corresponding style may be properly located lengthwise by laying its front edge in register with the mark 66 on the insole. Similarly a heel and shank reinforcing piece may be located lengthwise by laying its front edge in register with the mark 66, or substantially so, as indicated in Fig. 10. If desired, however, a gage 68 of another type (Fig. 12) may be provided for locating the front edges of the shank stiffener and the reinforcing piece. Conveniently, the gage 68 may be the same as the shank stiffener gage disclosed in the patent hereinbefore referred to.

Having thus described my invention, what I claim as new and desire to secure by Letters Patent of the United States is:

1. That improvement in methods of making composite insole units which consists in locating a jig-pin adjacent to the break line of a form having a surface contour corresponding to that of the heel seat, the shank and the ball area of a high-arch last, forming a jig-hole in an insole and a jig-hole in a molded metallic shank-stiffener at points corresponding to the location of said jig-pin, laying the insole on said form and the shank-stiffener on the insole with both of said jig-holes on said jig-pin to locate the insole and the shank-stiffener in true relation to the break line of said form, laying a moldable reinforcing piece on the heel seat and shank portion of the insole, and simultaneously molding the insole and the reinforcing piece with pressure against the form and securing one to the other while the interposed shank-stiffener and the insole are maintained by said jig-pin in true relation to the break line of said form.

2. The improvement defined in claim 1 characterized by providing the reinforcing piece with a jig-hole near its front end and locating that hole on the aforesaid jig-pin to maintain the front end of the reinforcing piece in a predetermined relation to the break line of the insole.

3. The improvement defined in claim 1, characterized by providing the insole and the shank-stiffener each with an additional jig-hole to receive an additional jig-pin projecting from the form, and placing both jig-holes of the insole and both jig-holes of the shank-stiffener on the jig-pins to maintain the insole and the shank-stiffener against widthwise displacement.

4. The improvement defined in claim 1, characterized by providing the insole and the shank-stiffener each with an additional jig-hole and providing the reinforcing piece with two jig-holes to correspond, placing the additional jig-holes of the insole and the shank-stiffener on an additional jig-pin projecting from the form, placing the jig-holes of the reinforcing piece on said jig-pins, and molding the parts so assembled with pressure against the form.

SIMON G. ROSS.